US010171630B2

(12) United States Patent
Loladia

(10) Patent No.: US 10,171,630 B2
(45) Date of Patent: Jan. 1, 2019

(54) EXECUTING REMOTE COMMANDS

(71) Applicant: Amazon Technologies, Inc., Seattle, WA (US)

(72) Inventor: Rameez Loladia, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 139 days.

(21) Appl. No.: 15/249,213

(22) Filed: Aug. 26, 2016

(65) Prior Publication Data

US 2018/0063289 A1 Mar. 1, 2018

(51) Int. Cl.
*G06F 9/54* (2006.01)
*H04L 29/06* (2006.01)
*H04L 12/18* (2006.01)

(52) U.S. Cl.
CPC ............ *H04L 67/42* (2013.01); *G06F 9/54* (2013.01); *G06F 9/546* (2013.01); *G06F 9/547* (2013.01); *H04L 12/1859* (2013.01); *H04L 63/0876* (2013.01)

(58) Field of Classification Search
CPC . G06F 9/54; G06F 9/546; G06F 9/547; H04L 67/42; H04L 12/1859; H04L 63/0876
See application file for complete search history.

(56) References Cited

U.S. PATENT DOCUMENTS

| 5,155,847 A * | 10/1992 | Kirouac | G06F 8/65 |
| | | | 709/221 |
| 9,122,734 B2 * | 9/2015 | Castro | G06F 17/30215 |
| 2006/0167897 A1 * | 7/2006 | Jones | G06F 9/542 |
| 2008/0016387 A1 * | 1/2008 | Bensinger | G06F 11/1451 |
| | | | 714/4.11 |
| 2008/0243954 A1 * | 10/2008 | Augenstein | G06F 11/1451 |
| 2010/0205427 A1 * | 8/2010 | Bauer | H04L 63/0884 |
| | | | 713/151 |
| 2010/0279675 A1 | 11/2010 | Slack | |
| 2011/0289498 A1 * | 11/2011 | Xie | G06F 8/61 |
| | | | 717/171 |
| 2012/0131115 A1 * | 5/2012 | Levell | G06F 9/466 |
| | | | 709/206 |
| 2012/0272252 A1 | 10/2012 | Beardsmore | |
| 2015/0281374 A1 * | 10/2015 | Petersen | H04L 67/12 |
| | | | 709/223 |
| 2015/0312177 A1 | 10/2015 | Ben-ezra | |

FOREIGN PATENT DOCUMENTS

GB 2 350 758 A 12/2000

OTHER PUBLICATIONS

International Search Report and Written Opinion for corresponding PCT Application No. PCT/US2017/048710 filed Aug. 25, 2017, dated Nov. 16, 2017, 17 pages.

* cited by examiner

*Primary Examiner* — John M Macilwinen
(74) *Attorney, Agent, or Firm* — Knobbe Martens Olson & Bear LLP

(57) ABSTRACT

A communication system and method for the utilization of messaging protocols to provide computing devices executable code. An administrative component can include executable code or instructions within the publication of content. Computing devices registered to receive this content can receive and execute the code (or instructions) and utilize the same messaging protocol to publish a result of the processing to be delivered to the admin device.

13 Claims, 11 Drawing Sheets

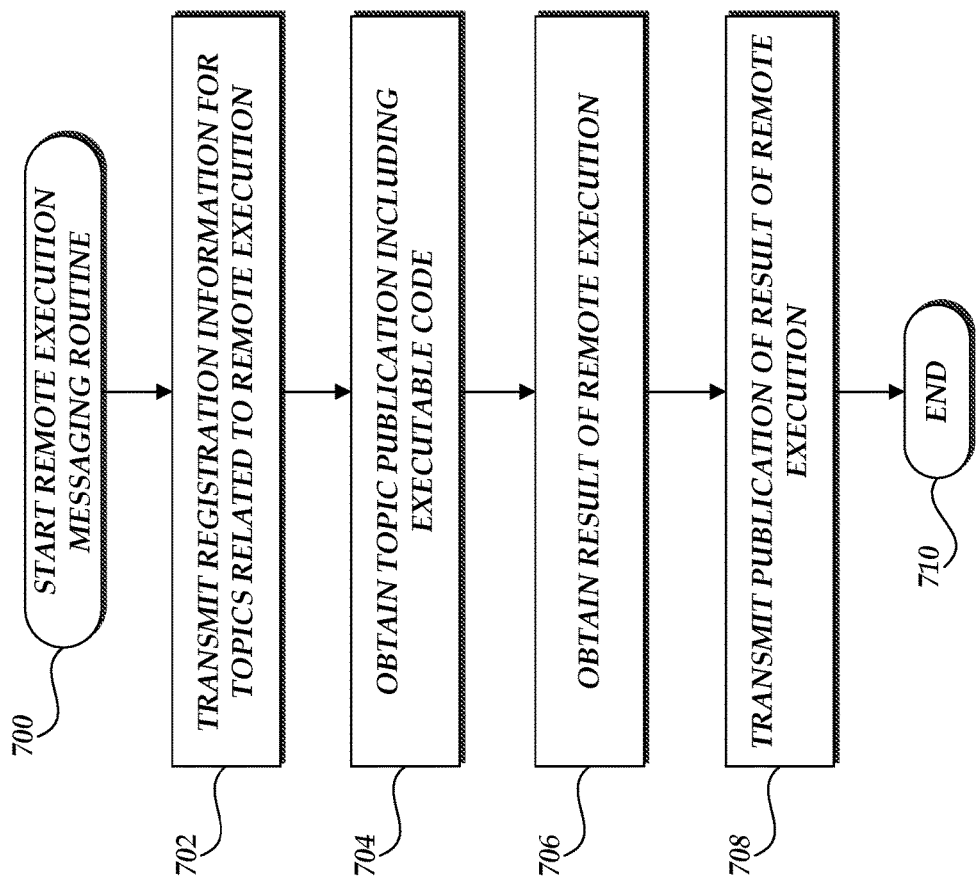

EXECUTING REMOTE COMMANDS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing machine to host one or more instances of virtual machines that appear and operate as independent computer machines to a connected computer user. With virtualization, a single physical computing device can create, maintain, or delete virtual machines in a dynamic manner. In turn, users can request computer resources from a data center and be provided with varying numbers of virtual machine resources on an "as needed" or "as requested" basis. In addition to virtual machines, a data center may provide other computing resources, including hardware computing capacity, data storage space, network bandwidth, and the like.

In some environments, the computing devices that communicate via the communication network can correspond to devices having a primary function as a computing device, such as a desktop personal computer. In other environments, at least some portion of the computing devices that communication via the communication network can correspond to embedded devices or thin devices that have at least one alternative primary function, such as household appliances having a separate primary purpose (e.g., a thermostat or refrigerator) while also providing at least limited computing functionality.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 7 is a flow diagram illustrative of a remote execution messaging routine implemented by a client computing device in accordance with an illustrative embodiment.

DETAILED DESCRIPTION

Figure 1:
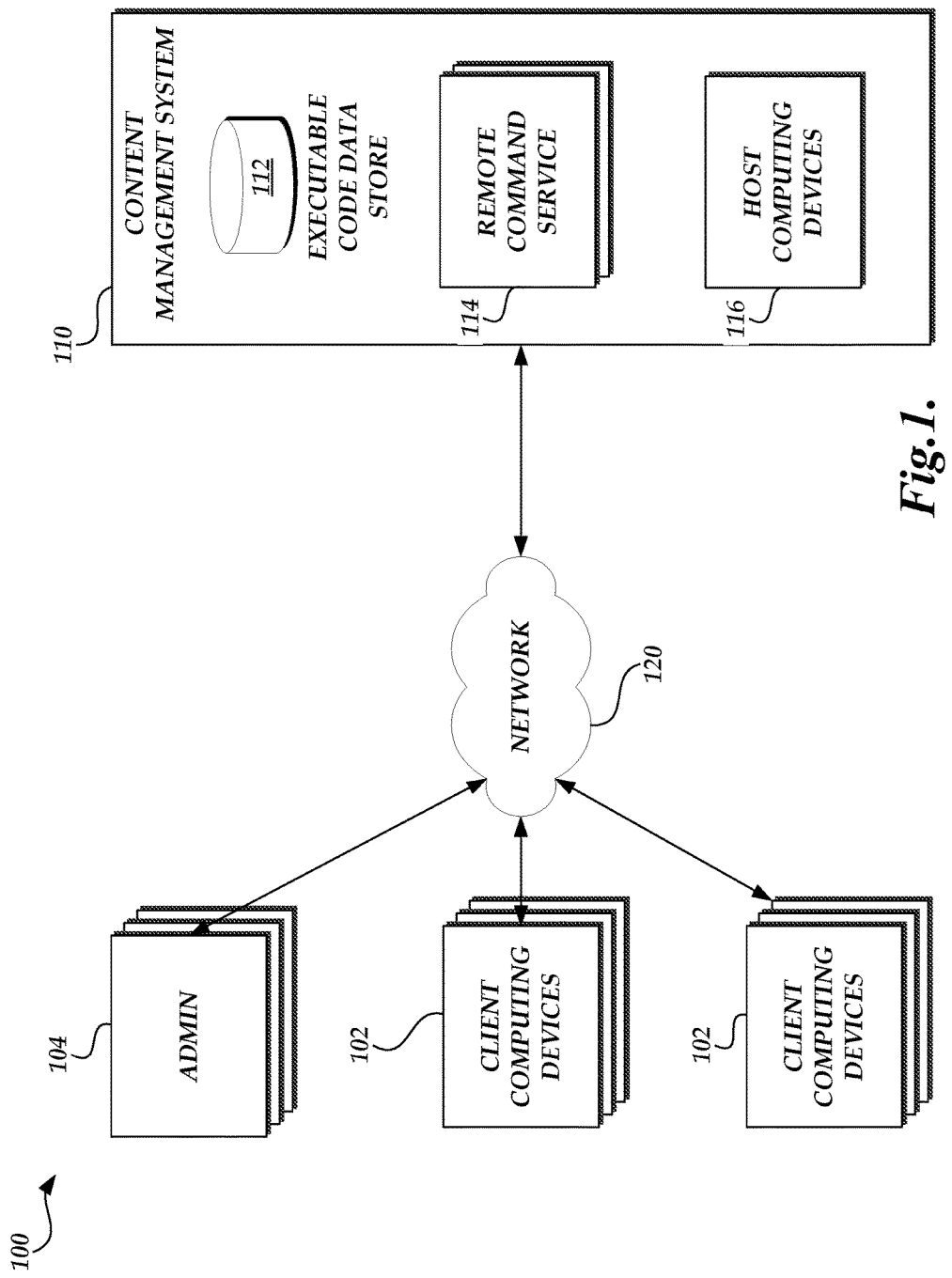
FIG. 1 is a block diagram of a communication management environment that includes one or more client devices, one or more admin devices, and a content management system according to one embodiment.

Generally described, the present application corresponds to the management of data transmitted between computing devices in a communication network. More specifically, aspects of the present application correspond to the utilization of messaging protocols to facilitate the management of client computing devices. Illustratively, one or more client devices utilize the messaging protocol, such as the MQTT messaging protocol, to exchange content. In accordance with aspects of the present application, an administrative component can include executable code or instructions within the publication of content. The client devices can execute the code (or instructions) and utilize the same messaging protocol to publish a result of the processing to be delivered to the admin device. By leveraging the existing messaging protocol, aspects of the present application mitigate the need for the client devices and admin device to engage in separate device to device communications to exchange the executable code.

With reference to an illustrative example, one or more client computing devices are in communication with a service provider that provides one or more remote command services. The remote command services facilitate communications with other computing devices by leveraging a standard messaging protocol. Illustratively, the messaging protocol can include the ability for devices to register with the remote command services to receive content related to a particular topic. As the remote command services receive content related to a topic, the remote command services can then forward or publish the content to registered devices. In one embodiment, the remote command services can utilize the MQTT messaging protocol.

With continued reference to the previous example, to facilitate the delivery on content without utilizing direct communications, one or more client devices register via the MQTT protocol to receive content related to a content delivery topic (e.g., a designated topic corresponding to the delivery and executive executable code). Thereafter, an admin device can publish content to the remote command services that includes executable code to be implemented by one or more of the devices. As the content is published to the remote command services, the remote command services can then forward or push the content to the client devices based on the registration information. Additionally, the admin device can register with the remote command services to receive content related to a content execution topic (e.g., a designated topic corresponding to a result of executing code).

Subsequent to the execution of the executable code (or other content), the client device(s) can publish content to the remote command services that includes a result of processing the executable code. As the content is published to the remote command services, the remote command services can then forward or push the content to the admin devices based on the registration information.

Although aspects of some embodiments described in the disclosure will focus, for the purpose of illustration, on the MQTT messaging protocol and other configuration of the devices, one skilled in the relevant art will appreciate that the examples are illustrative only and are not necessarily intended to be limiting.

FIG. 1 is a block diagram depicting an illustrative logical network 100 including multiple client computing devices 102 and multiple admin devices 104 in communication with a content management system 110 via a network 120. While the client computing devices 102 and admin devices 104 are shown as a group within FIG. 1, the client computing devices 102 and admin devices 104, individually or as a grouping may be geographically distant, and independently owned or operated. For example, the client computing devices 102 could represent a multitude of users in various global, continental, or regional locations accessing the content parsing system 110. In another example, the client computing devices 102 could be part of a grouping of multiple of devices associated with specific users, such as number of computing components associated with various device. Similarly, while one set of illustrative components is shown to represent the content management system 110, multiple instances of each component may be present within the content management system 110, and such components may be located within geographically diverse areas (e.g., globally, continentally, or regionally), in order to provide a wide geographical presence for the content management system 110.

Network 120 may be any wired network, wireless network, or combination thereof. In addition, the network 120 may be a personal area network, local area network, wide area network, cable network, satellite network, cellular telephone network, or combination thereof. In the example environment of FIG. 1, network 120 is a global area network (GAN), such as the Internet. Protocols and components for communicating via the other aforementioned types of communication networks are well known to those skilled in the art of computer communications and thus, need not be described in more detail herein. While each of the client computing devices 102, admin devices 104, and content management system 110 is depicted as having a single connection to the network 120, individual components of the client computing devices 102, admin devices 104, and content management system 110 may be connected to the network 120 at disparate points. Accordingly, communication times and capabilities may vary between the components of FIG. 1.

Client computing devices 102 may include any number of different computing devices capable of communicating with the content management system 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Each client computing device 102 may optionally include one or more data stores (not shown in FIG. 1) including various applications or computer-executable instructions, such as web browsers, used to implement the embodiments disclosed herein. On an individual basis, client computing devices 102 may generally have access to fewer computing resources (e.g., processing power, memory, persistent storage space, electronic power, network communication capabilities, etc.) than the content management system 110. Illustrative components of a client computing device 102 will be described with regard to FIG. 2. In one embodiment, the client computing devices 102 can be referred to as Internet of Things ("IOT") devices representative of a class of devices in which computing functionality can be embedded within devices having at least one additional alternative functionality. Examples include, but are not limited, household appliances, controls for various other devices, consumer goods, and the like.

Similar to the client computing devices 102, the admin devices 104 may include any number of different computing devices capable of communicating with the content management system 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Each client computing device 104 may optionally include one or more data stores (not shown in FIG. 1) including various applications or computer-executable instructions, such as web browsers, used to implement the embodiments disclosed herein. On an individual basis, client computing devices 104 may generally have access to fewer computing resources (e.g., processing power, memory, persistent storage space, electronic power, network communication capabilities, etc.) than the content management system 110.

In accordance with embodiments, the content management system 110 includes one or more servers for implementing remote command services 114, one or more host computing devices 116 for implementing virtual machine instances associated with client computing devices 102, and an executable code data store 112. As described in further detail below, the remote command services 114 can receive registration request from client computing devices 102 and admin devices 104 for content items associated with particular topics. As such, in some aspects, the remote command services 114 may receive content published by the admin devices 104 that include executable code or other instructions to be executed by the client devices 102. In other aspects, the remote command services 114 can receive content published by the client computing devices 102 corresponding to a processing result. The remote command services 114 can then publish the received content. Illustrative components of an intermediary server 114 will be described with regard to FIG. 3.

It will be appreciated by those skilled in the art that the content management system 110 may have fewer or greater components than are illustrated in FIG. 1. Thus, the depiction of the content parsing system 110 in FIG. 1 should be taken as illustrative. For example, in some embodiments, components of the content management system 110, such as the remote command services 114, may be executed by one more virtual machines implemented in a hosted computing environment. A hosted computing environment may include one or more rapidly provisioned and released computing resources, which computing resources may include computing, networking or storage devices.

Figure 2:
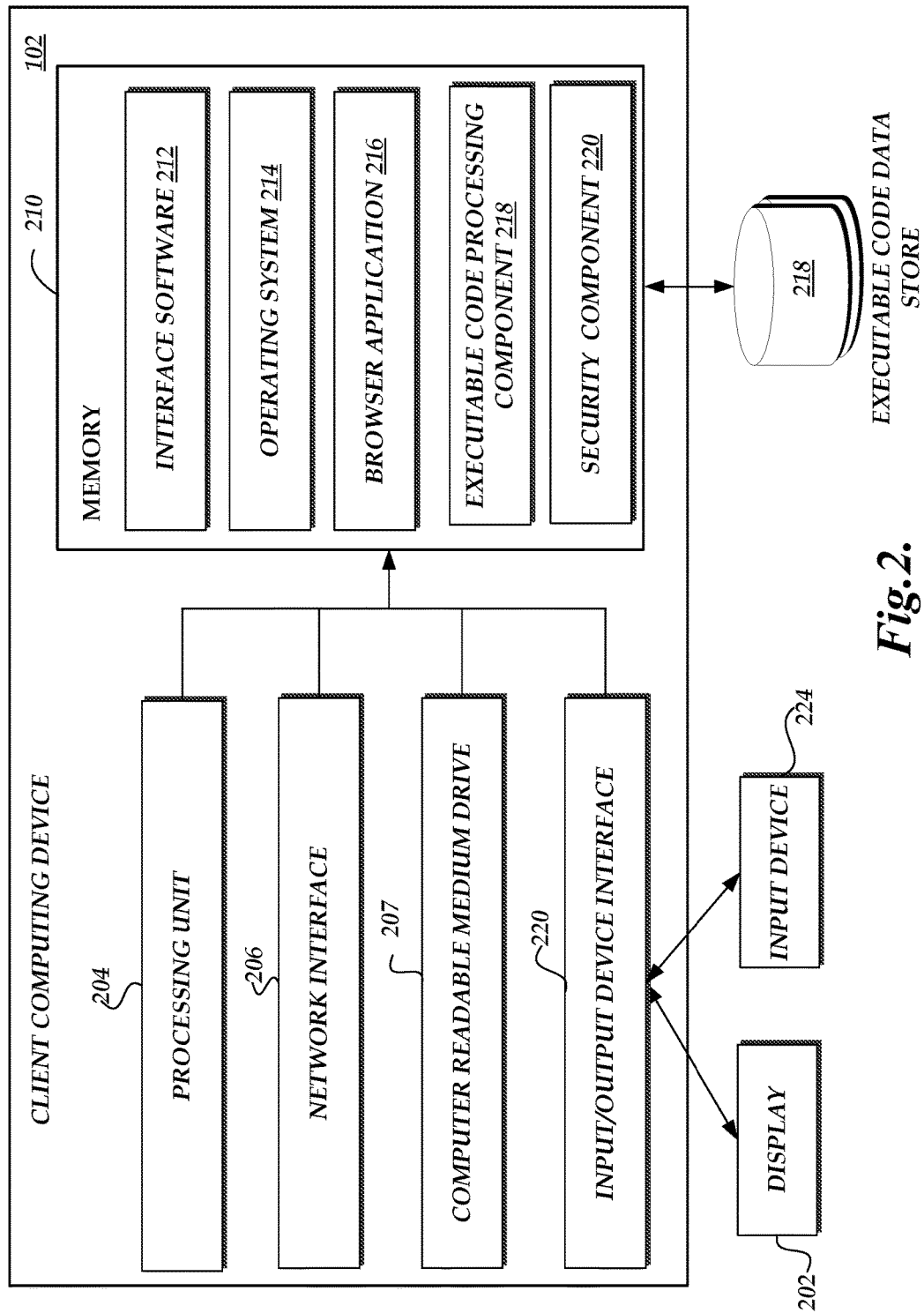
FIG. 2 is a block diagram of illustrative components of a client computing device configured to remotely process content in accordance with an illustrative embodiment.

FIG. 2 depicts one embodiment of an architecture of an illustrative client computing device 102 that can generate and process content compressed in accordance with the present application. The general architecture of the client computing device 102 depicted in FIG. 2 includes an arrangement of computer hardware and software components that may be used to implement aspects of the present disclosure. As illustrated, the management component 112 includes a processing unit 204, a network interface 206, a computer readable medium drive 207, an input/output device interface 220, an optional display 202, and an input device 224, all of which may communicate with one another by way of a communication bus. Illustratively, the client computing device 102 may have more limited functionality and components, such as inputs or outputs, as embedded devices.

The network interface 206 may provide connectivity to one or more networks or computing systems, such as the network 120 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc. In some embodiments, the client 102 may include more (or fewer) components than those shown in FIG. 2. For example, some embodiments of the client computing device 102 may omit the display 202 and input device 224, while providing input/output capabilities through one or more alternative communication channel (e.g., via the network interface 206).

The memory 210 may include computer program instructions that the processing unit 204 executes in order to implement one or more embodiments. The memory 210 generally includes RAM, ROM or other persistent or non-transitory memory. The memory 210 may store an operating system 214 that provides computer program instructions for use by the processing unit 204 in the general administration and operation of the client 102. The memory 210 may further include computer program instructions and other information for implementing aspects of the present disclosure. For example, in one embodiment, the memory 210 includes a browser application 216 for accessing content. The memory 210 may further include an executable code processing component 218 for processing and executing code provided by the admin devices 104. The client computing devices 102 can further include an executable code data store 218 for maintaining executable code received by the client computing devices, which may be omitted. Still further, the client computing devices 102 can include a security component 220 for facilitating the validation and processing of security credentials for individual users of the client computing devices 102 or the client computing devices themselves.

Figure 3:
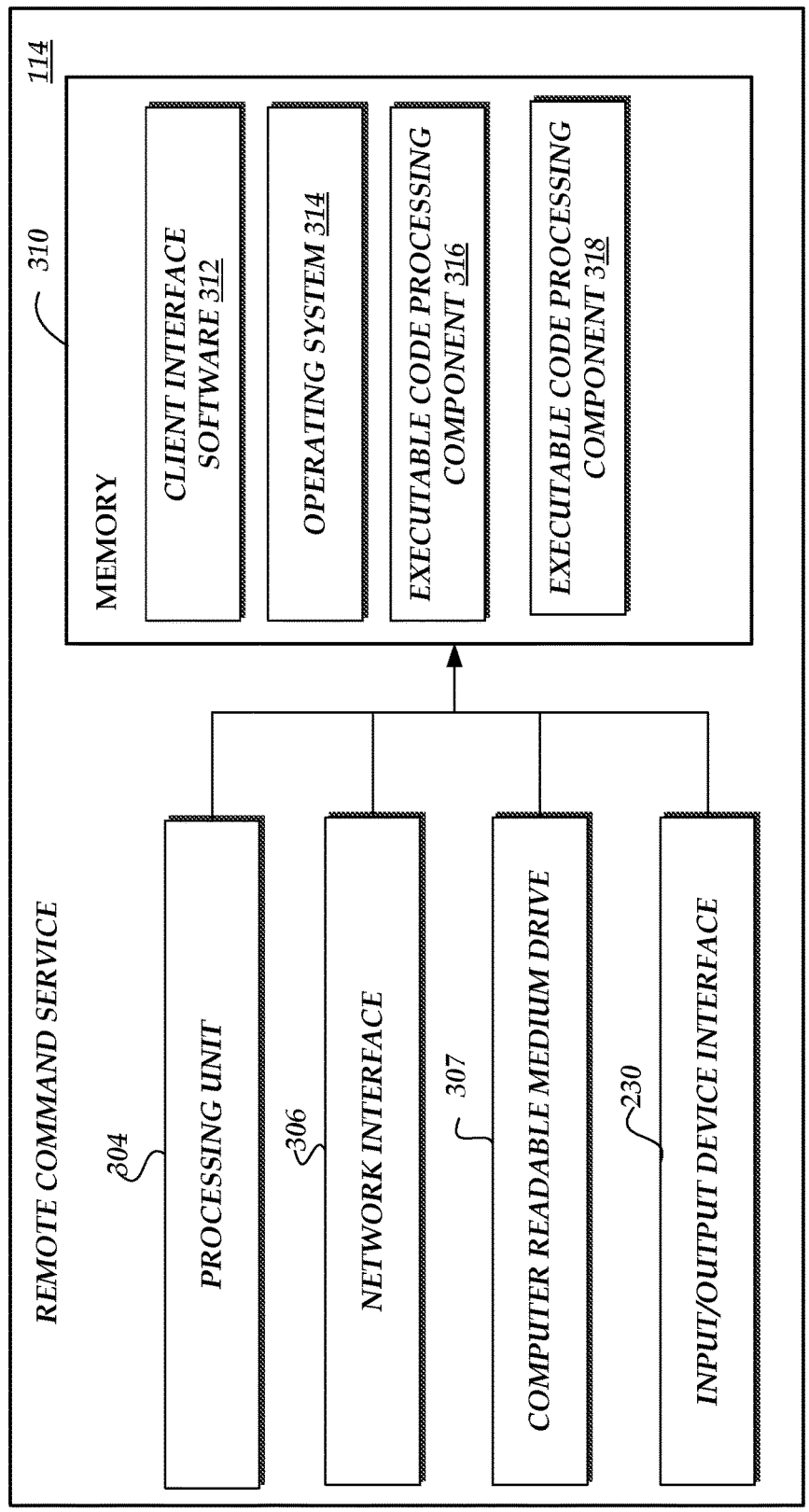
FIG. 3 is a block diagram of illustrative components of a remote command service computing device configured to provide content in accordance with an illustrative embodiment.

FIG. 3 depicts one embodiment of an architecture of an illustrative server for implementing the remote command services 114 component described herein. The general architecture of the remote command services 114 depicted in FIG. 3 includes an arrangement of computer hardware and software components that may be used to implement aspects of the present disclosure. As illustrated, the remote command services 114 includes a processing unit 304, a network interface 306, a computer readable medium drive 307, an input/output device interface 320, an optional display 302, and an input device 324, all of which may communicate with one another by way of a communication bus. The components of the remote command services 114 may be physical hardware components or implemented in a virtualized environment.

The network interface 306 may provide connectivity to one or more networks or computing systems, such as the network 130 of FIG. 1. The processing unit 304 may thus receive information and instructions from other computing systems or services via a network. The processing unit 304 may also communicate to and from memory 310 and further provide output information for an optional display 302 via the input/output device interface 320. The input/output device interface 320 may also accept input from the optional input device 324, such as a keyboard, mouse, digital pen, etc. In some embodiments, the remote command services 114 may include more (or fewer) components than those shown in FIG. 3. For example, some embodiments of the remote command services 114 may omit the display 202 and input device 224, while providing input/output capabilities through one or more alternative communication channel (e.g., via the network interface 306).

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the intermediary server 114. The memory 310 may further include computer program instructions and other information for implementing aspects of the present disclosure. For example, in one embodiment, the memory 310 includes client interface software 312 for receiving and processing content requests from client devices 102. Additionally, the memory 310 includes an executable code processing component 316 for processing executable code to be transmitted to the client computing devices 102. Still further, the memory 310 can include a security component 318 for facilitating the validation and processing of security credentials for individual users of the client computing devices 102 or the client computing devices themselves. The security component 318 can correspond to the security component 220 of the client computing devices 102 (FIG. 2).

Figure 4A:
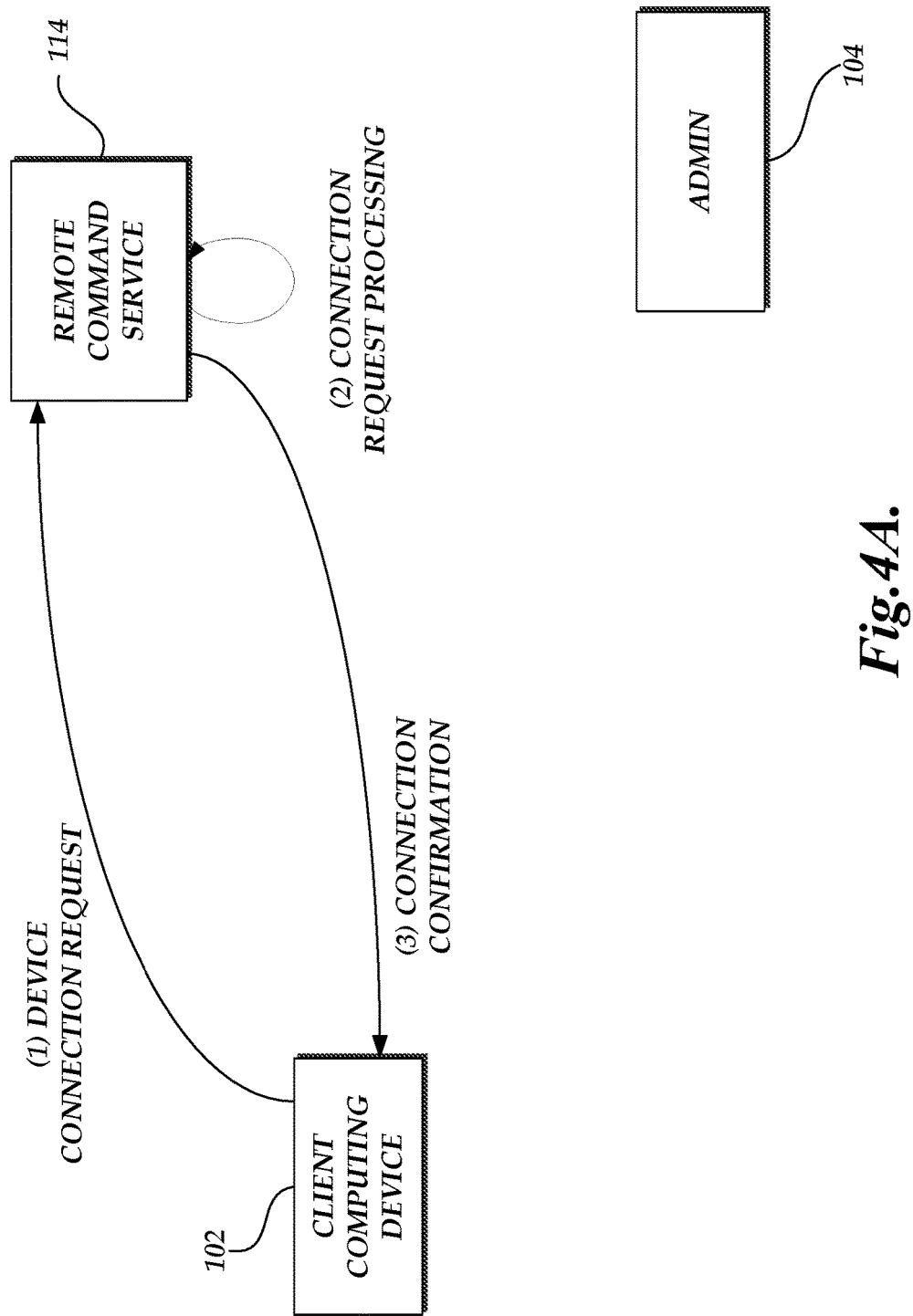
FIG. 4A is a block diagram of the communication management environment of FIG. 1 illustrating the interaction between the illustrated components in generating requests for content in accordance with an illustrative embodiment.
Figure 4B:
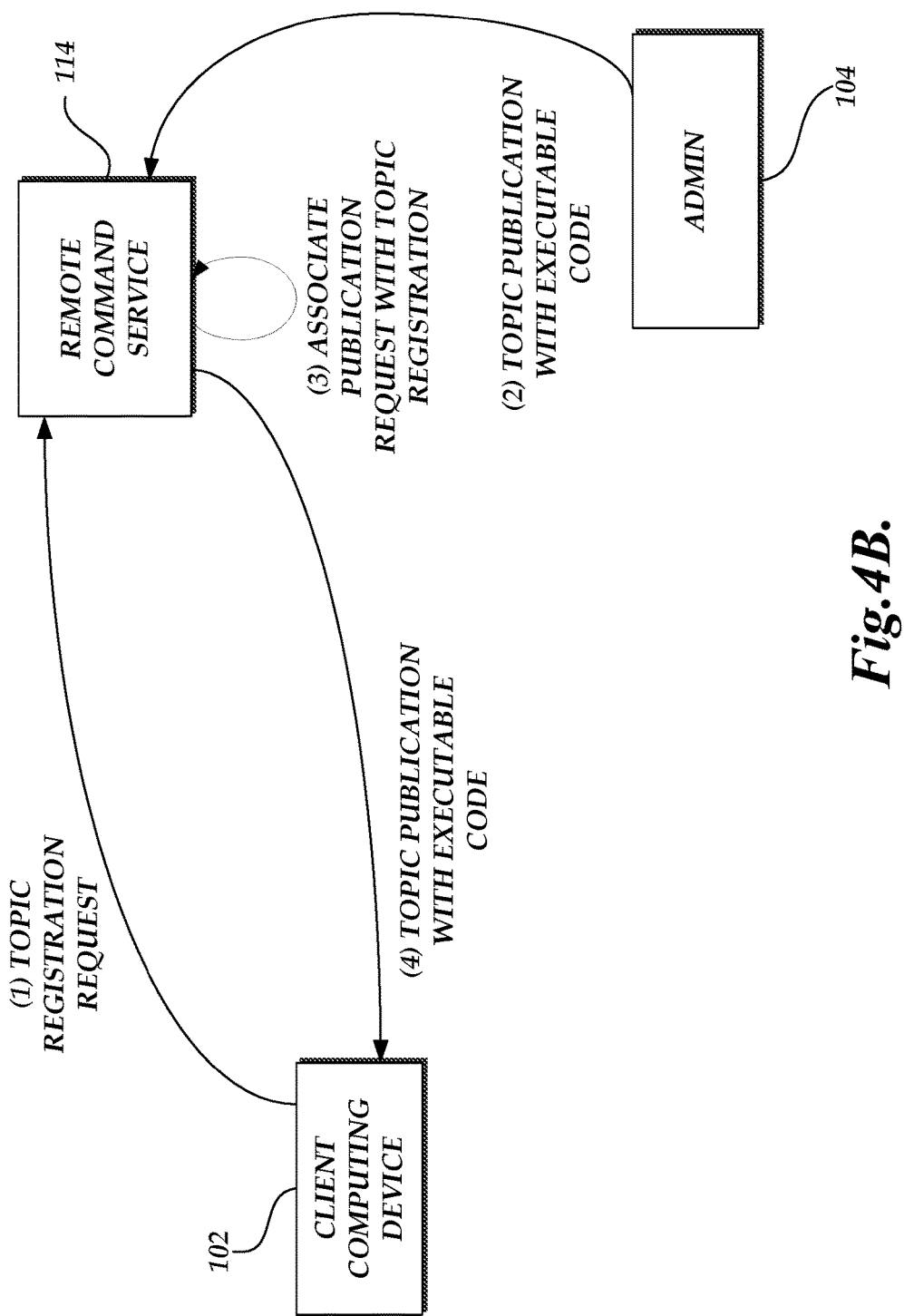
FIG. 4B is a block diagram of the communication management environment of FIG. 1 illustrating the interaction between the illustrated components for generating and publishing content including executable code in accordance with an illustrative embodiment.
Figure 4C:
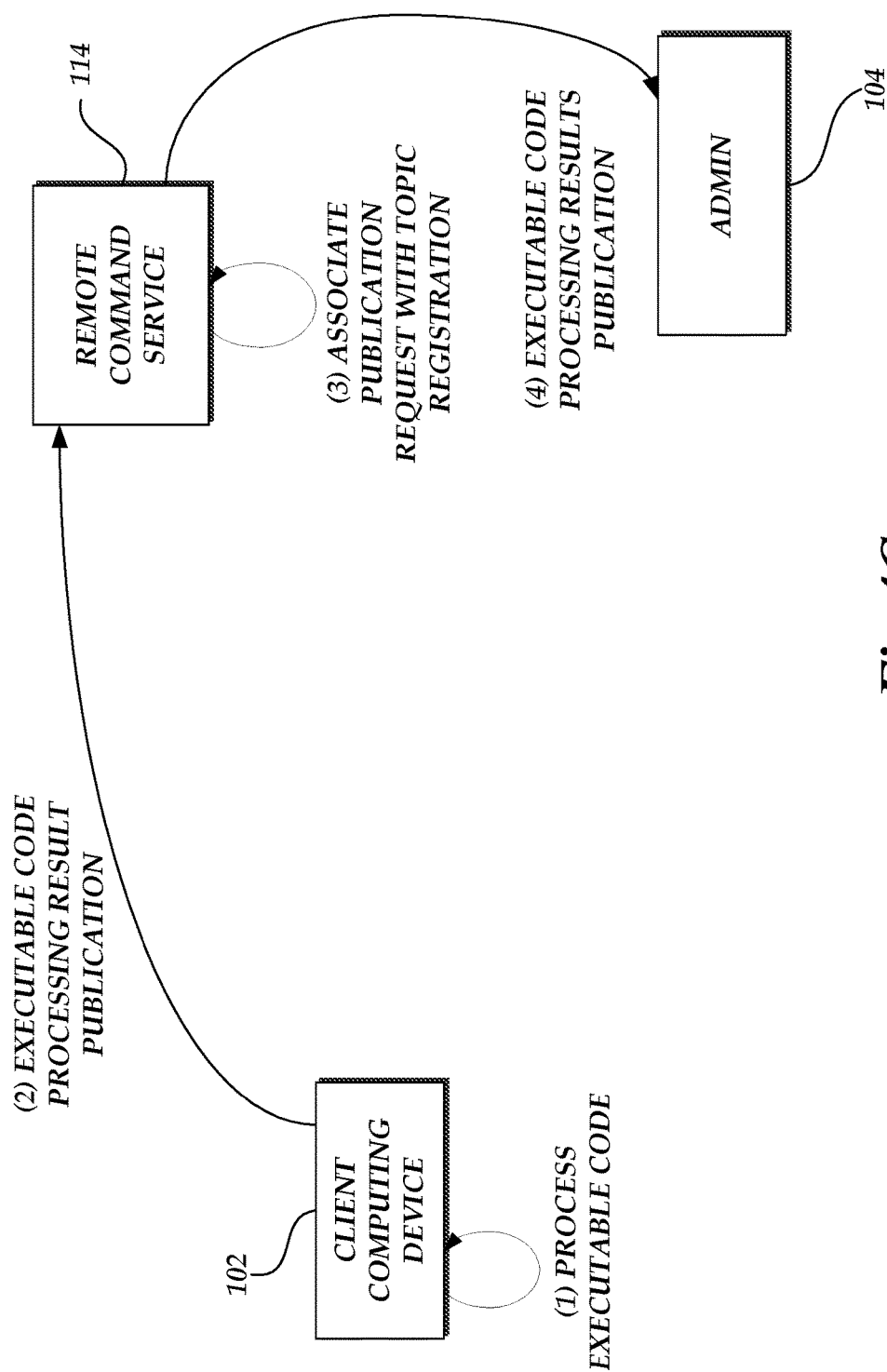
FIG. 4C is a block diagram of the communication management environment of FIG. 1 illustrating the interaction between the illustrated components in generating and publishing processing results in accordance with an illustrative embodiment.

Turning now to FIGS. 4A-4C, illustrative interactions between the components of the content management system 110 to process content will be described. More specifically, FIGS. 4A-4C will be described with regard to interactions between a client computing device 102, an admin device 104 and the remote command services 114. Additionally, although depicted as a single interaction between a client computing device 102, admin device 104 and the remote command services 114, in some embodiments, the remote command services can interact with a plurality of client computing devices 102 using the same processes illustrated in FIGS. 4A-4C.

With reference to FIG. 4A, at (1), the client computing device 102 generates a device connection request and transmits the request to the remote command services 114. Illustratively, the device connection request corresponds to establish procedures associated with the authentication and authorization of the client computing device 102 with the remote services 114. Still further, in some embodiments, the logical network 100 can include additional gateway components that independently, or as part of the content management system 110, manage the transmission of the messages to the remote command services 114. Such gateway components can implement security functionality, load balancing, or other network processing services.

At (2), the remote command services 114 processes the connection request such as by validating security information, requesting additional information or determining the characteristics of the requesting client computing device 102. At (3), if the connection request is acceptable and authorized, the remote command services 114 transmits a connection confirmation to the requesting client computing device 102. In this regarding, once authorized, the client computing device and remote command services 114 can begin communication within the procedures defined in a messaging protocol, such as MQTT.

With reference now to FIG. 4B, after receiving the connection confirmation, at (1), the client computing device 102 transmits one or more topic registration requests to the remote command services 114. Illustratively, the topic registration is defined in accordance with the messaging protocol such that the client computing device 102 can register to receive content published according to specific topics by any number of content providers. As applied to the present application, the client computing devices 102 registers for one or more topics that have been identified as executable code to be executed by the client computing device, generally referred to as "update topics." In one embodiment, the client computing devices 102 can be pre-configured to register for update topics. In other embodiments, individual users may interact with the client computing devices 102 to configure the client computing devices to register for the update topics. The update topics can be unique to individual client computing devices 102. Alternatively, the update topics can apply to multiple client computing devices 102 or sets of client computing devices 102.

At some point after registration, at (2), an admin device 104 publishes one or more pieces content to the remote command services 114. Each published piece of content is associated with a topic. For purpose of an illustrative example, at least one published content is associated with an update topic that corresponds to a registered topic of the client computing devices 102. Additionally, the published piece of content associated with the update content includes or otherwise references executable code, configurations or other instructions that are desired to be implemented by one or more client computing devices 102.

At (3), the remote command services 114 matches the registered topics with the published topics to determine that the client computing devices 102 should receive the published content with the update topic. At (4), the remote command services 114 transmits the published content. Illustratively, the transmittal of the published content is done in accordance with the procedures and capabilities of the messaging protocol, such as MQTT, and does not require additional or alternative communications to cause the transmission of the executable code.

With reference to FIG. 4C, at (1), the client computing device 102 processes the received published content, extracts any executable code or instructions and executes the extracted code/instructions. One skilled in the relevant art will appreciate that the executable code can cause the client computing devices 102 to modify configuration, update executable code or data, implement some action and the like. At (2), the client computing devices generates and publishes, via the messaging protocol, content related to information indicative of the processing results of the code. In some embodiments, the processing result can correspond to a binary determination of whether the execution of the code was successfully carried out. In another embodiment, the processing result can include one or more values indicative of the execution of the code/instruction or a log detailing information about the execution of the code/instructions. In a manner similar to that described with the publication of update topics, the publication of the processing result(s) can be associated with a particular topic, generally referred to as "processing result topic."

Still further, in other embodiments, the client computing device 102 can publish progress reports as part of the processing of the executable code. In these embodiments, the client computing device 102 may not necessarily have completed the processing of the executable code in its entirety. It can publish the checkpoint results to the remote command service 114 or an additional component, such as a stand-alone component for monitoring progress. In this regard, the publication of the processing result can include some information, such as rollback information, that facilitates instructions for the client computing device 102 to roll-back or undo aspects of the executed code. Still further, based on the collected cumulative progress information, the remove command service 114 or other dedicated component can compile group statistic and publish the result. For example, the group statistics can include overall percentage completion statistics, error rate statistics, success rate statistics, resources consumed during the implementation of the update, financial costs (based on an attribution factor) associated with the execution of the code on individual client computing devices, resource consumption regarding executing the executable code, and the like.

At (3), the remote command services 114 matches the admin devices that have registered for progress/update topics with the published topics from the client devices to determine that the admin device 104 should receive the published content with the processing result topic. At (4), the remote command services 114 transmits the published content. Illustratively, the transmittal of the published content is also done in accordance with the procedures and capabilities of the messaging protocol, such as MQTT, and does not require additional or alternative communications to cause the transmission of the executable code. In some embodiments, the entire process outlined in FIGS. 4A-4C can be repeated. Additionally, or alternatively, in other embodiments, portions of the process outlined in FIGS. 4A-4C can be repeated. For example, the publication of the processing results by the client devices 102 can be repeated at various milestones in the execution the code.

In addition to the receiving and processing the processing results of one or more client devices 102, in some embodiments, the admin device 104 o remote command service 114 can monitor the receipt of processing result publications and identify any client devices 102 that have not provided processing results within a defined time window. In these embodiments, the lack of publication of processing results can be further processed. For example, the admin device 104 can republished the message with the executable code (as illustrated in FIG. 1) to attempt to get the client device(s) to execute the code again. In other examples, the admin device 104 may cause the transmission of additional executable code via a message to attempt to repair a client device 102 or otherwise de-activate the client device.

Figure 5A:
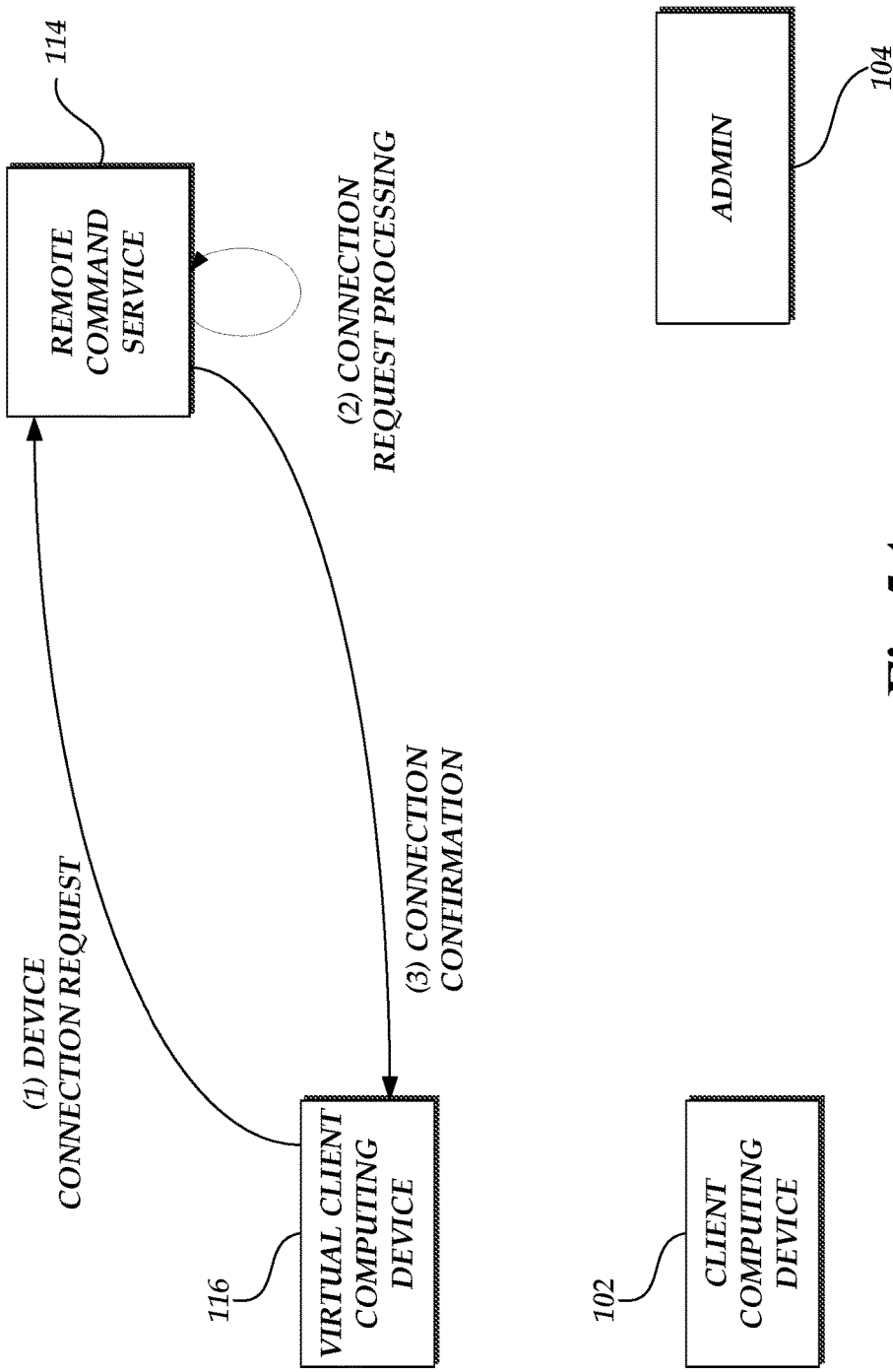
FIG. 5A is a block diagram of the communication management environment of FIG. 1 illustrating the interaction between the illustrated components in generating requests for content in accordance with an illustrative embodiment.

Turning now to FIGS. 5A-4C, illustrative interactions between the components of the content management system 110 to process content will be described. More specifically, FIGS. 5A-5C will be described with regard to interactions between a client computing device 102, a virtual client computing device implemented by host computing device 116, an admin device 104 and the remote command services 114. In this embodiment, the content management system 110 can utilize a virtualized representation of one or more client computing devices 102 that will follow a similar interaction associated with the publication and processing of update topics. Thereafter, the resulting update to the virtual client device 116 can synchronized with the actual client computing device 102.

With reference to FIG. 5A, at (1), the virtual client computing device 116 generates a device connection request and transmits the request to the remote command services 114. Illustratively, the device connection request corresponds to establish procedures associated with the authentication and authorization of the virtual client computing device 116 with the remote services 114.

At (2), the remote command services 114 processes the connection request such as by validating security information, requesting additional information or determining the characteristics of the requesting virtual client computing device 116. At (3), if the connection request is acceptable and authorized, the remote command services 114 transmits a connection confirmation to the requesting virtual client computing device 116. In this regarding, once authorized, the client computing device and remote command services 114 can begin communication within the procedures defined in a messaging protocol, such as MQTT.

Figure 5B:
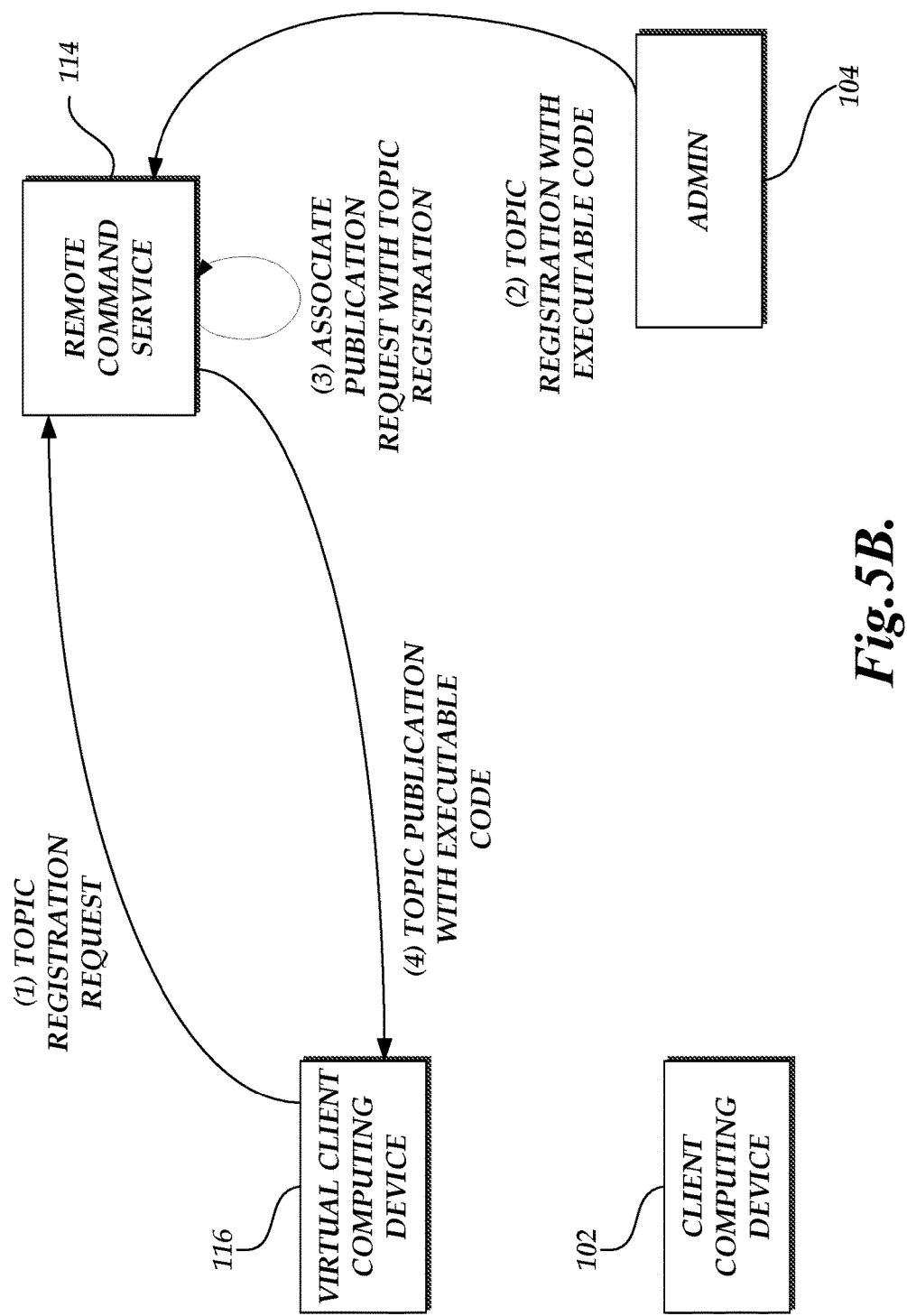
FIG. 5B is a block diagram of the communication management environment of FIG. 1 illustrating the interaction between the illustrated components for generating and processing compressed data in accordance with compression dictionaries.

With reference now to FIG. 5B, after receiving the connection confirmation, at (1), the virtual client computing device 116 transmits one or more topic registration requests to the remote command services 114. Illustratively, the topic registration is defined in accordance with the messaging protocol such that the virtual client computing device 116 can register to receive content published according to specific topics by any number of content providers. As applied to the present application, the virtual client computing device 116 registers for one or more topics that have been identified as executable code to be executed by the client computing device, generally referred to as "update topics." In one embodiment, the client computing devices 102 can be pre-configured to register for update topics. In other embodiments, individual users may interact with the virtual client computing device 116 to configure the client computing devices to register for the update topics. The update topics can be unique to individual virtual client computing device 116 or groups of devices.

At some point after registration, at (2), an admin device 104 publishes one or more pieces content to the remote command services 114. Each published piece of content is associated with a topic. For purpose of an illustrative example, at least one published content is associated with an update topic that corresponds to a registered topic of the virtual client computing device 116. Additionally, the published piece of content associated with the update content includes or otherwise references executable code, configurations or other instructions that are desired to be implemented by one or more virtual client computing device 116.

At (3), the remote command services 114 matches the registered topics with the published topics to determine that the client computing devices 102 should receive the published content with the update topic. At (4), the remote command services 114 transmits the published content. Illustratively, the transmittal of the published content is done in accordance with the procedures and capabilities of the messaging protocol, such as MQTT, and does not require additional or alternative communications to cause the transmission of the executable code.

Figure 5C:
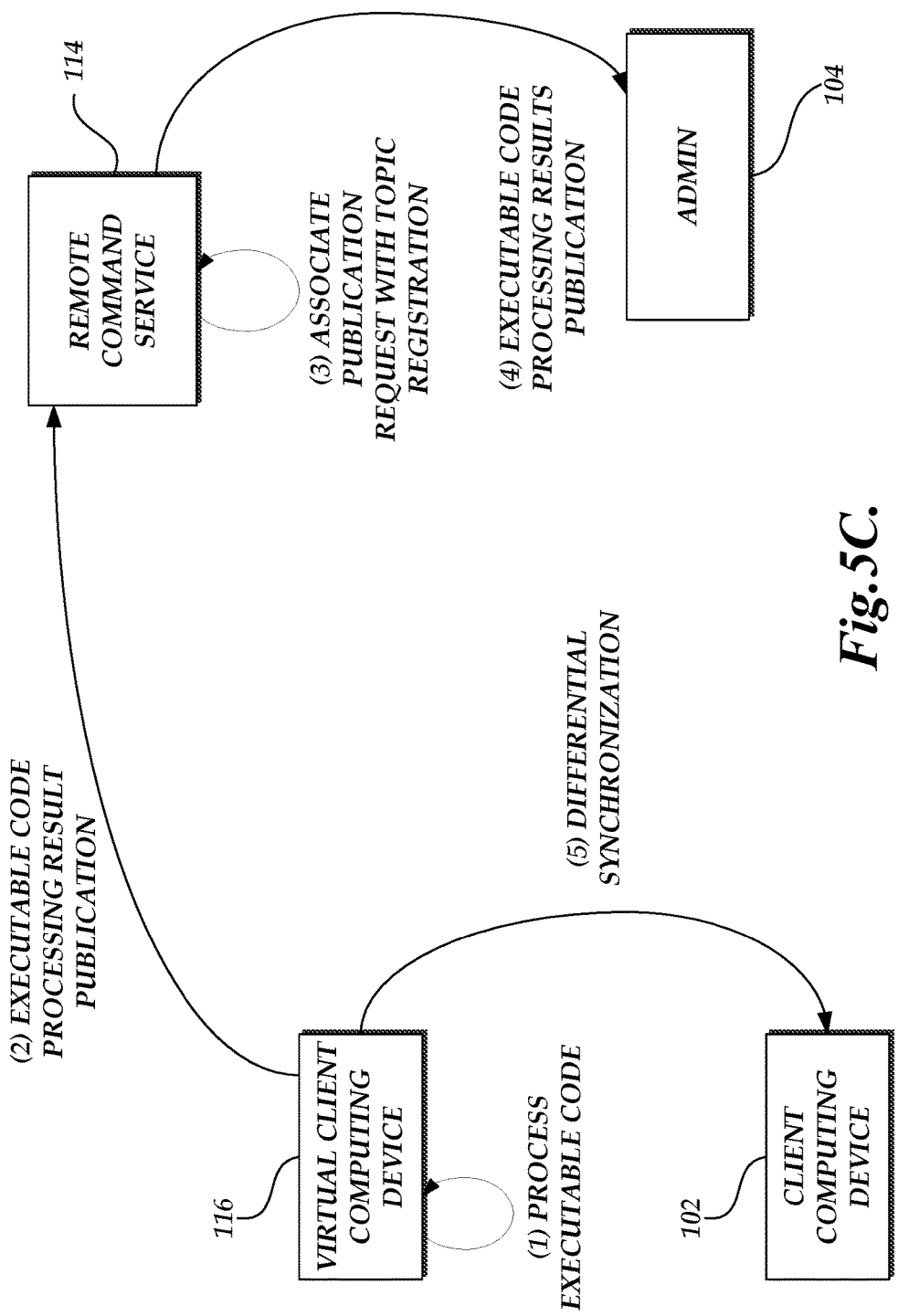
FIG. 5C is a block diagram of the communication management environment of FIG. 1 illustrating the interaction between the illustrated components in generating and publishing processing results in accordance with an illustrative embodiment.

With reference to FIG. 5C, at (1), the virtual client computing device 116 processes the received published content, extracts any executable code or instructions and executes the extracted code/instructions. One skilled in the relevant art will appreciate that the executable code can cause the virtual client computing device 116 to modify configuration, update executable code or data, implement some action and the like. At (2), the client computing devices generates and publishes, via the messaging protocol, content related to information indicative of the processing results of the code. In some embodiments, the processing result can correspond to a binary determination of whether the execution of the code was successfully carried out. In another embodiment, the processing result can include one or more values indicative of the execution of the code/instruction or a log detailing information about the execution of the code/instructions. In a manner similar to that described with the publication of update topics, the publication of the processing result(s) can be associated with a particular topic, generally referred to as "processing result topic."

At (3), the remote command services 114 matches the registered topics with the published topics to determine that the admin device 104 should receive the published content with the processing result topic. At (4), the remote command services 114 transmits the published content. Illustratively, the transmittal of the published content is also done in accordance with the procedures and capabilities of the messaging protocol, such as MQTT, and does not require additional or alternative communications to cause the transmission of the executable code. At (5), the virtual client computing device 116 is synchronized with the client computing devices 102. In one embodiment, the virtual client computing device 116 can utilize other network protocols to determine incremental updates to the client computing device and limit data transmissions to the incremental update.

Figure 6:
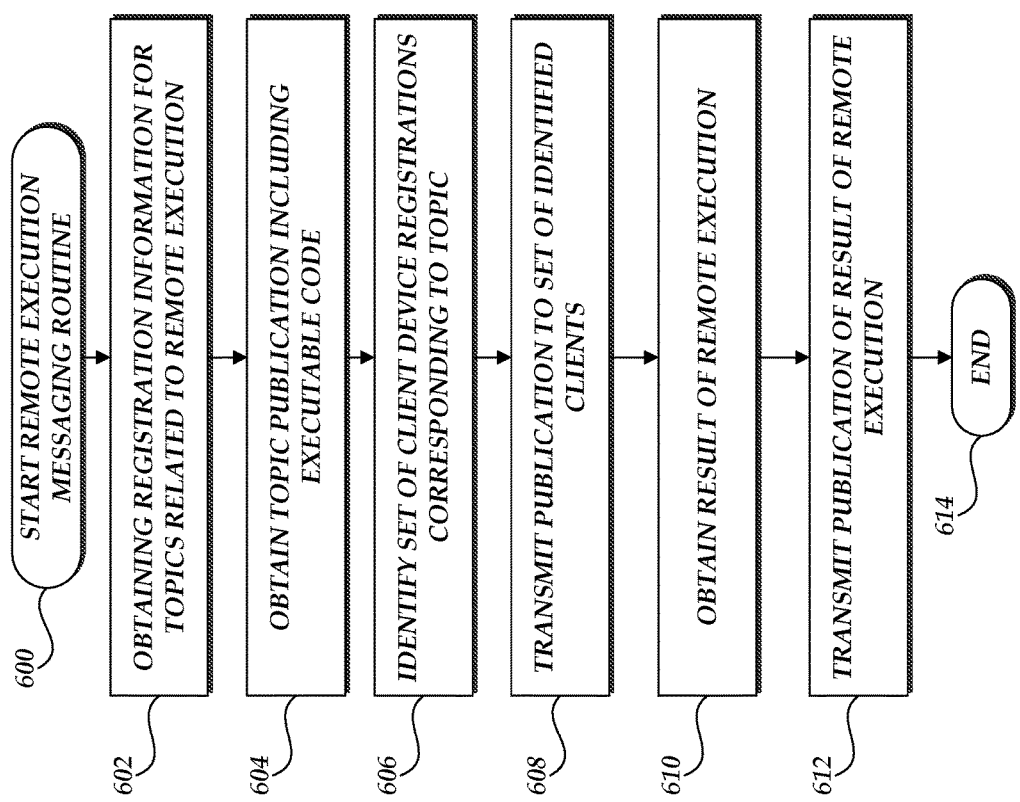
FIG. 6 is a flow diagram illustrative of a remote execution messaging routine implemented by a remote command service component in accordance with an illustrative embodiment.

FIG. 6 is a flow diagram illustrative of a remote execution messaging routine 600 implemented by a remote command service component 114 in accordance with an illustrative embodiment. At block 602, the remote command services 114 obtains registration information including at least one topic related to the remote execution of content by a client computing device 102 or set of client computing devices 102. As described previous, the client computing devices 102 transmit one or more topic registration requests to the remote command services 114. Illustratively, the topic registration is defined in accordance with the messaging protocol such that the client computing device 102 can register to receive content published according to specific topics by any number of content providers. In one embodiment, the client computing devices 102 can be pre-configured to register for update topics. In other embodiments, individual users may interact with the client computing devices 102 to configure the client computing devices to register for the update topics. The update topics can be unique to individual client computing devices 102. Alternatively, the update topics can apply to multiple client computing devices 102 or sets of client computing devices 102.

At some point after registration, at block 604, the remote command services 114 obtains one or more publications on an update topic. Illustratively, an admin device 104 publishes one or more pieces content to the remote command services 114. Each published piece of content is associated with a topic. For purpose of an illustrative example, at least one published content is associated with an update topic that corresponds to a registered topic of the client computing devices 102. Additionally, the published piece of content associated with the update content includes or otherwise references executable code, configurations or other instructions that are desired to be implemented by one or more client computing devices 102.

At block 606, the remote command services 114 matches the registered topics with the published topics to determine that the client computing devices 102 should receive the published content with the update topic to form the set of client devices that should receive the published topic. Illustratively, since the remote command services 114 are configured in accordance with the messaging protocol, such as MQTT, matching registrations to topic publication can be accomplished in the manner dictated by the messaging protocol. At block 608, the remote command services 114 transmits the published content. Similarly, the transmittal of the published content is done in accordance with the procedures and capabilities of the messaging protocol, such as MQTT, and does not require additional or alternative communications to cause the transmission of the executable code. The client computing device 102 processes the received published content, extracts any executable code or instructions and executes the extracted code/instructions. One skilled in the relevant art will appreciate that the executable code can cause the client computing devices 102 to modify configuration, update executable code or data, implement some action and the like.

At block 610, the remote command services 114 obtains processing results corresponding to the processing of the execution code. Illustratively, the client computing devices generates and publishes, via the messaging protocol, content related to information indicative of the processing results of the code. In some embodiments, the processing result can correspond to a binary determination of whether the execution of the code was successfully carried out. In another embodiment, the processing result can include one or more values indicative of the execution of the code/instruction or a log detailing information about the execution of the code/instructions. In a manner similar to that described with the publication of update topics, the publication of the processing result(s) can be associated with a particular topic, generally referred to as "processing result topic."

At block 612, the remote command services 114 matches the registered topics with the published topics to determine that the admin device 104 should receive the published content with the processing result topic and transmits the published content. Illustratively, the transmittal of the published content is also done in accordance with the procedures and capabilities of the messaging protocol, such as MQTT, and does not require additional or alternative communications to cause the transmission of the executable code. As previously described, in other embodiments, based on the collected cumulative progress information, the remote command service 114 or other dedicated component can compile group statistic and publish the result. For example, the group statistics can include overall percentage completion statistics, error rate statistics, success rate statistics, resources consumed during the implementation of the update, financial costs (based on an attribution factor) associated with the execution of the code on individual client computing devices, resource consumption regarding executing the executable code, and the like.

At block 614, the routine 600 terminates.

FIG. 7 is a flow diagram illustrative of a remote execution messaging routine 700 implemented by a client computing device 102 in accordance with an illustrative embodiment. At block 702, the client computing device 102 transmits one or more topic registration requests to the remote command services 114. As described above, the topic registration is defined in accordance with the messaging protocol such that the client computing device 102 can register to receive content published according to specific topics by any number of content providers. In one embodiment, the client computing devices 102 can be pre-configured to register for update topics. In other embodiments, individual users may interact with the client computing devices 102 to configure the client computing devices to register for the update topics. The update topics can be unique to individual client computing devices 102. Alternatively, the update topics can apply to multiple client computing devices 102 or sets of client computing devices 102.

In response to receiving published content, the remote command services 114 matches the registered topics with the published topics to determine that the client computing devices 102 should receive the published content with the update topic. At block 704, the client computing devices 102 receives published content from the remote command services 114. Illustratively, the transmittal of the published content is done in accordance with the procedures and capabilities of the messaging protocol, such as MQTT, and does not require additional or alternative communications to cause the transmission of the executable code.

As part of the execution of the execution of content or after the execution of content, at block 706, the client computing device obtains the results of the remote execution. In some embodiments, the processing result can correspond to a binary determination of whether the execution of the code was successfully carried out. In another embodiment, the processing result can include one or more values indicative of the execution of the code/instruction or a log detailing information about the execution of the code/instructions. In a manner similar to that described with the publication of update topics, the publication of the processing result(s) can be associated with a particular topic, generally referred to as "processing result topic."

At block 708, the client computing device 102 publishes, via the messaging protocol, content related to information indicative of the processing results of the code. Illustratively, the transmittal of the published content is done in accordance with the procedures and capabilities of the messaging protocol, such as MQTT, and does not require additional or alternative communications to cause the transmission of the executable code. As also previously described, the client computing device 102 may not necessarily have completed the processing of the executable code in its entirety prior to publishing the processing result. It can publish the checkpoint results to the remote command service 114 or an additional component, such as a stand-alone component for monitoring progress. Additionally, the publication of the processing result can include some information, such as rollback information, that facilitates instructions for the client computing device 102 to roll-back or undo aspects of the executed code. At block 710, the routine 700 terminates.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing the execution of commands on a computing device utilizing a messaging protocol comprising:
   receiving, at a remote command service, a published first command message from an administrative client device, the first command message comprising executable code for execution on a remote device subscribed to a first topic in accordance with the MQ Telemetry Transport protocol;
   authenticating, by the remote command service, the first command message;
   causing execution of the executable code on a virtual copy of the remote device, the virtual copy comprising a virtual machine hosted separately from the remote command service;
   causing a differential synchronization of the remote device by:
      publishing, by the remote command service, a second command message based on the first command message to the remote device on the first topic, the second command message comprising an incremental update to the remote device; and
      receiving, by the remote command service, a published response message from the remote device on a second topic, the response message indicative of a result of the execution of the second command message, wherein the administrative client device is subscribed to the second topic; and
   publishing, by the remote command service, the response message to the administrative client on the second topic.

2. The computer-implemented method of claim 1, wherein authenticating the first command message is performed based on at least one of information associated with an identity of the administrative client device, information associated with an identity of the remote device, and the content of the executable code.

3. The computer-implemented method of claim 1, wherein the second command message comprises the executable code of the first command message.

4. A system for managing the execution of commands utilizing a message protocol comprising:
   an administrative client device configured to publish command messages on a first topic in accordance with the MQ Telemetry Transport protocol, the messaging protocol defining opportunities for one or more devices to subscribe to command messages published according to the first topic;
   one or more devices configured to receive and publish messages formed in accordance with the MQ Telemetry Transport protocol; and
   a remote command service in communication with the administrative client device and the one or more devices, the remote command service configured to receive and publish,
   wherein the remote command service is configured to:
      receive a first command message from the administrative client device corresponding to the first topic, the first command message comprising executable code for execution on the one or more devices;
      cause execution of the executable code on a virtual copy of the one or more devices, the virtual copy comprising a virtual machine hosted separately from the remote command service;
      cause a differential synchronization of the devices by:
         publishing a second command message to the one or more devices based on subscription information associated with the first topic, the second command message comprising an incremental update to the one or more devices; and
         receiving published response messages from the one or more devices, the response messages corresponding to an indication regarding the execution of code associated with the second command message; and publish the response messages to the administrative client device on the second topic.

5. The system of claim 4, wherein the remote command service is further configured to authenticate the first command message based on at least one of information associated with an identity of the administrative client device, information associated with an identity of the remote device, and the content of the executable code.

6. The system of claim 5, wherein the remote command service is configured to authenticate the first command message before publishing the second command message to the one or more devices.

7. The system of claim 4, wherein the second command message includes at least a portion of executable code included in the first command message.

8. The system of claim 4, wherein the messaging protocol comprises the MQ Telemetry Transport protocol, and wherein the remote command service comprises a message broker in accordance with the MQ Telemetry Transport protocol.

9. A computer-implemented method for managing the execution of commands utilizing message protocols comprising:
   receiving, at a remote command service configured to receive and publish messages in accordance with the MQ Telemetry Transport protocol, a published first command message from an administrative client device corresponding to a first topic, the first command message comprising executable code for execution on one or more remote devices;
   causing execution of the executable code on a virtual copy of the one or more remote devices, the virtual copy comprising a virtual machine hosted separately from the remote command service;
   causing a differential synchronization of the one or more remote devices by:
   publishing, by the remote command service, a second command message to the one or more remote devices based on the first command message and subscription information associated with the first topic, the second command message comprising an incremental update to the one or more remote devices; and
   receiving a published response message from the one or more devices, the response message corresponding to an indication regarding the execution of code associated with the second command message; and
   publishing, by the remote command service, the response message to the administrative client device on the second topic.

10. The computer-implemented method of claim 9 further comprising authenticating the first command message based on at least one of information associated with an identity of the administrative client device, information associated with an identity of the remote device, and the content of the executable code.

11. The computer-implemented method of claim 10, wherein publishing the second command message occurs after the first command message is authenticated.

12. The computer-implemented method of claim 9, wherein receiving the published response message includes receiving a published message corresponding to progress information associated with the execution of the executable code.

13. The computer-implemented method of claim 9, wherein the messaging protocol comprises the MQ Telemetry Transport protocol, and wherein the remote command service comprises a message broker in accordance with the MQ Telemetry Transport protocol.

* * * * *